(12) United States Patent
Zhang et al.

(10) Patent No.: US 10,627,922 B2
(45) Date of Patent: Apr. 21, 2020

(54) COMPUTER STYLUS HAVING INTEGRATED ANTENNA STRUCTURES

(71) Applicant: Apple Inc., Cupertino, CA (US)

(72) Inventors: Lu Zhang, Shanghai (CN); Yi Jiang, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/143,009

(22) Filed: Sep. 26, 2018

(65) Prior Publication Data

US 2020/0097102 A1    Mar. 26, 2020

(51) Int. Cl.
| | |
|---|---|
| G06F 3/0354 | (2013.01) |
| H01Q 1/38 | (2006.01) |
| H01Q 19/02 | (2006.01) |
| G06F 3/038 | (2013.01) |
| G06F 3/044 | (2006.01) |

(52) U.S. Cl.
CPC ........... *G06F 3/03545* (2013.01); *H01Q 1/38* (2013.01); *G06F 3/038* (2013.01); *G06F 3/044* (2013.01); *G06F 2203/0384* (2013.01); *H01Q 19/027* (2013.01)

(58) Field of Classification Search
CPC ............ G06F 3/03545; G06F 3/04883; H02G 3/0691; H02G 3/083; H02G 15/013; H02G 15/117
See application file for complete search history.

(56) References Cited

U.S. PATENT DOCUMENTS

| | | | | |
|---|---|---|---|---|
| 4,164,971 | A | * | 8/1979 | Strand .................... F16B 33/06 156/330 |
| 5,206,785 | A | * | 4/1993 | Hukashima .......... G01D 5/2417 361/283.2 |
| 5,475,401 | A | | 12/1995 | Verrier et al. |
| 6,262,684 | B1 | | 7/2001 | Stewart et al. |
| 7,646,347 | B2 | | 1/2010 | Ying |
| 7,656,355 | B2 | | 2/2010 | Hsin |

(Continued)

FOREIGN PATENT DOCUMENTS

| | | |
|---|---|---|
| JP | 2006019775 | 1/2006 |
| WO | 2010128942 | 11/2010 |

OTHER PUBLICATIONS

Zhang et al. U.S. Appl. No. 15/906,937, filed Feb. 27, 2018.

*Primary Examiner* — Dong Hui Liang
(74) *Attorney, Agent, or Firm* — Treyz Law Group, P.C.; Tianyi He

(57) ABSTRACT

A computer stylus may be provided that includes an elongated body with a tip and an opposing end coupled together by a shaft that includes a metal tube. The stylus may include a substrate at the end of the elongated body and conductive traces on the substrate. The conductive traces on the substrate may form an antenna ground, an antenna resonating element arm, and a return path. The antenna resonating element arm may be a helical structure that wraps around the substrate. The antenna ground formed from the conductive traces may be coupled to the metal tube using an intermediate metal layer. A cap structure formed at the opposing end and over the substrate may be interposed between the conductive traces and adhesive to protect the conductive traces from the adhesive. A metal portion of the cap structure may serve as an antenna signal reflector.

20 Claims, 14 Drawing Sheets

(56) References Cited

U.S. PATENT DOCUMENTS

| | | |
|---|---|---|
| 8,028,921 B2 | 10/2011 | Silverbrook et al. |
| 8,432,322 B2 | 4/2013 | Amm et al. |
| 8,577,289 B2 | 11/2013 | Schlub et al. |
| 9,633,247 B2 | 4/2017 | Pope et al. |
| 9,766,727 B2 | 9/2017 | Jiang et al. |
| 9,817,491 B2 | 11/2017 | Rebeschi et al. |
| 9,891,726 B1 | 2/2018 | Laslo |
| 9,898,105 B2 | 2/2018 | Ogata et al. |
| 9,965,052 B2 | 5/2018 | Coutts et al. |
| 2006/0094464 A1* | 5/2006 | Kyou .................... G06F 1/1626 455/556.1 |
| 2008/0094292 A1 | 4/2008 | Su |
| 2011/0023289 A1* | 2/2011 | Finn ................. G06K 19/07722 29/601 |
| 2011/0133997 A1 | 6/2011 | Lee |
| 2013/0207925 A1 | 8/2013 | Ryshtun et al. |
| 2015/0116291 A1 | 4/2015 | Leung et al. |
| 2015/0138024 A1 | 5/2015 | Kalistaja et al. |
| 2015/0363013 A1* | 12/2015 | Coutts ................. G06F 3/03545 345/179 |
| 2017/0010697 A1* | 1/2017 | Jiang .................... G06F 3/03545 |
| 2017/0068339 A1* | 3/2017 | Zimmerman ......... G06F 3/0383 |
| 2018/0052531 A1 | 2/2018 | Peretz et al. |
| 2018/0052534 A1 | 2/2018 | Ron et al. |
| 2018/0309190 A1* | 10/2018 | Niakan .................... H01Q 1/22 |

* cited by examiner

COMPUTER STYLUS HAVING INTEGRATED ANTENNA STRUCTURES

BACKGROUND

This relates generally to wireless communications circuitry and, more particularly, to wireless communications circuitry for elongated wireless devices such as computer styluses.

It can be challenging to form wireless circuitry for electronic equipment. For example, it can be difficult to incorporate wireless components such as antennas into compact portable devices such as tablet computer styluses. If care is not taken, the presence of conductive structures for the electronic device will adversely affect antenna performance. Poor antenna performance can lead to the use of increased transceiver power and reduced battery life. Poor antenna performance can also degrade wireless functionality.

It would therefore be desirable to be able to provide improved wireless circuitry for wireless devices such as computer styluses.

SUMMARY

A computer stylus may be provided that supplies input to an electronic device such as a tablet computer. The stylus may have an elongated body with a tip and an opposing end coupled together by a shaft. The shaft may include a metal tube and an outer tube that covers the metal tube.

The computer stylus may include a dielectric substrate (e.g., a dielectric structure or antenna carrier) at the end of the elongated body and conductive traces or other conductive structures on the dielectric substrate. The dielectric substrate may extend along the longitudinal axis of the shaft and have a circumference or perimeter. An antenna may be formed from the conductive traces. In particular, an antenna resonating element arm formed from the conductive traces may wraps more than 180 degrees around the circumference of the dielectric substrate. As an example, the antenna resonating element arm on the dielectric support structure may also wraps less than 720 degrees around the circumference.

The conductive traces may be formed directly on the dielectric support structure. The conductive traces may also form an antenna ground and a return path. A ground antenna feed terminal may be coupled to the antenna ground portion of the conductive traces and a positive antenna feed terminal may be coupled to the antenna resonating element arm.

The antenna ground portion of the conductive traces may be coupled to the metal tube using a metal plate. The metal plate may be biased against the dielectric substrate using a fastener. The metal tube may have an opening aligned with the antenna ground portion. Transceiver circuitry may be coupled to the antenna by a transmission line. The dielectric support structure may have a groove and the transmission line may extend along the groove.

A cap structure may have an elongated portion that is interposed between the outer tube and the antenna resonating element arm. The elongated portion of the cap structure may be interposed between adhesive material and the dielectric carrier and may surround the dielectric carrier. The cap structure may include a metal reflector for the antenna. The substrate may be interposed between the cap structure and the metal tube.

DETAILED DESCRIPTION

Figure 1:
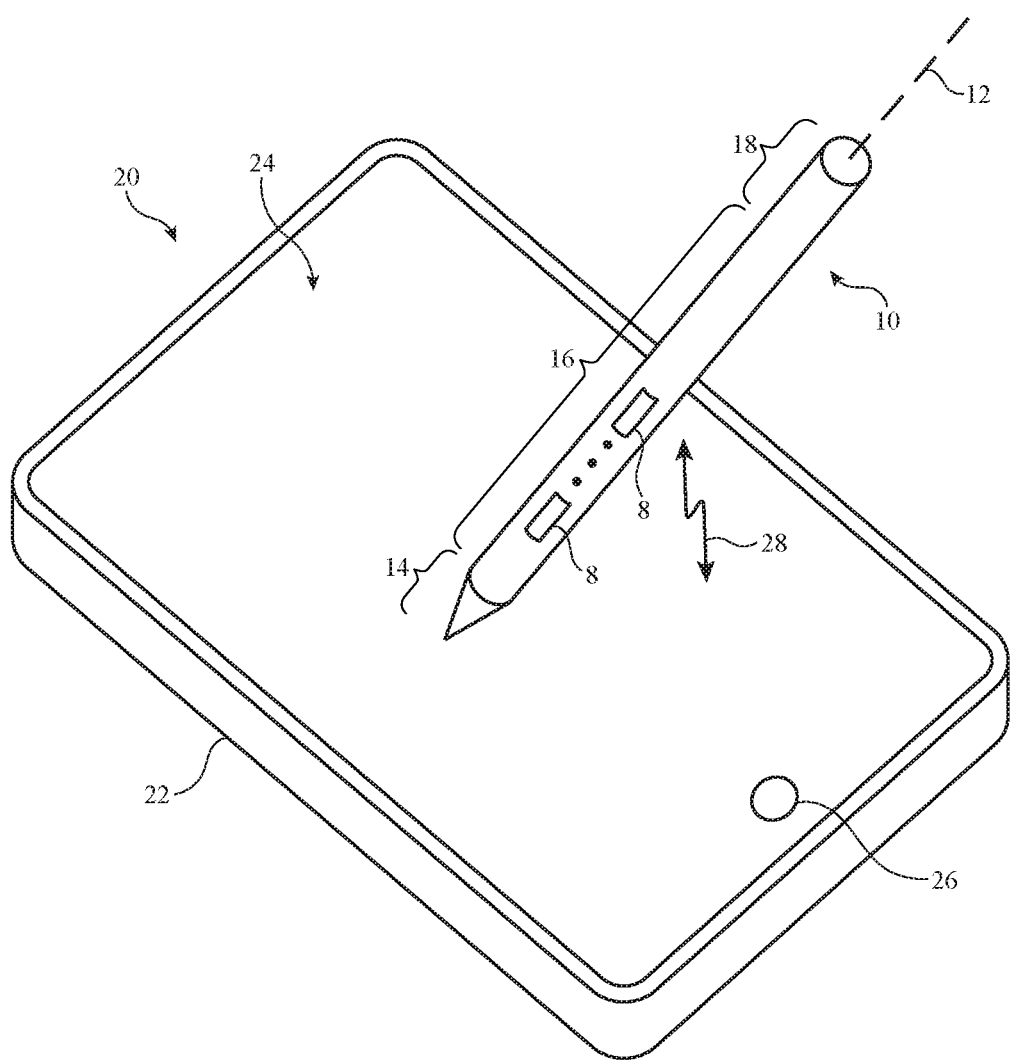
FIG. 1 is a perspective view of an illustrative computer and associated computer stylus in accordance with some embodiments.

A system that includes electronic equipment that communicates wirelessly is shown in FIG. 1. The equipment of FIG. 1 includes electronic device 10 and electronic device 20. Electronic equipment such as devices 10 and 20 may, in general, be computing devices such as laptop computers, computer monitors containing embedded computers, tablet computers, cellular telephones, media players, or other handheld or portable electronic devices, smaller devices such as wrist-watch devices, pendant devices, headphone or earpiece devices, devices embedded in eyeglasses or other equipment worn on a user's head, or other wearable or miniature devices, televisions, computer displays that do not contain embedded computers, gaming devices, navigation devices, embedded systems such as a systems in which electronic equipment is mounted in kiosks or automobiles, computer accessories such as touch pads, computer mice, computer styluses, or other electronic accessories, equipment that implements the functionality of two or more of these devices, or other electronic equipment. In the illustrative configuration of FIG. 1, which is sometimes described herein as an example, device 20 is a tablet computer or other device with a touch screen and device 10 is a computer stylus. When a drawing program or other software is running on tablet computer 20, a user can use stylus 10 to draw on tablet computer 20 and to provide other input to tablet computer 20.

Tablet computer 20 may include a housing such as housing 22 in which display 24 is mounted. Input-output devices such as button 26 may be used to supply input to tablet computer 20. Button 26 may be omitted if desired. Display 24 may be a capacitive touch screen display or a display that includes other types of touch sensor technology. The touch sensor of display 24 may be configured to receive input from stylus 10.

Stylus 10 may have a cylindrical shape or other elongated body that extends along longitudinal axis 12. The body of stylus 10 may be formed from metal and/or plastic tubes and other elongated structures. Stylus 10 and tablet computer 20 may contain wireless circuitry for supporting wireless communications via wireless communications link 28. As an example, stylus 10 may supply wireless input to tablet computer 20 via link 28 (e.g., information on settings in a drawing program or other software running on tablet computer 20, input to select a desired on-screen option, input to supply tablet computer 20 with a touch gesture such as a stylus flick, input to draw a line or other object on display 24, input to move or otherwise manipulate images displayed on display 24, etc.).

Stylus 10 may have a tip such as tip 14. Tip 14 may contain a conductive elastomeric member that is detected by the capacitive touch sensor of display 24. If desired, tip 14 may contain active electronics (e.g., circuitry that transmits signals that are capacitively coupled into the touch sensor of display 24 and that are detected as touch input on the touch sensor).

Shaft portion 16 of stylus 10 may couple tip 14 of stylus 10 to opposing end 18 of stylus 10. End 18 may contain a conductive elastomeric member, active electronics (e.g., circuitry that transmits signals that are capacitively coupled into the touch sensor of display 24 and that are detected as touch input on the touch sensor), buttons, sensor components such as a touch sensor, proximity sensor, or force sensor, or other input-output components.

Sensor components at end 18 of stylus 10 or elsewhere in stylus 10 may, for example, generate touch or proximity sensor data indicative of whether or not end 18 or other portions of stylus 10 are being pressed against display 24 of tablet computer 20, force sensor data indicative of how hard end 18 or other portions of stylus 10 are being pressed against display 24 of tablet computer 20, etc. Wireless circuitry in stylus 10 may convey this sensor data to tablet computer 20 over link 28. Tablet computer 20 may change settings in a drawing program or may perform other operations based on the sensor data received from stylus 10. As one example, tablet computer 20 may use the received sensor data to activate an eraser function associated with a drawing program running on tablet computer 20, or may perform any other desired operations.

If desired, a force sensor may additionally or alternatively be incorporated into tip 14 of stylus 10. A force sensor in tip 14 may be used to measure how forcefully a user is pressing tip 14 of stylus 10 against the outer surface of display 24. Force data may then be wirelessly transmitted from stylus 10 to tablet computer 20 so that the thickness of a line that is being drawn on display 24 can be adjusted accordingly or so that tablet computer 20 may take other suitable action.

If desired, stylus 10 may be provided with a clip to help attach stylus 10 to a user's shirt pocket or other object, may be provided with a magnet to help attach stylus 10 to a magnetic attachment point in tablet computer 20 or other structure, or may be provided with other structures that help a user attach stylus 10 to external objects. Components such as components 8 may be formed on stylus 10 (e.g., on shaft 16 or elsewhere). Components 8 may include buttons, touch sensors, and other components for gathering input, light-emitting diodes or other components for producing output, etc. Components 8 may, for example, include input-output components such as a data port connector that receives a cable or other wire-based connectors (e.g., a connector that supplies power signals for charging a battery in stylus 10 and/or that supplies digital data), conductive structures that receive wireless power for charging the battery in stylus 10 and/or that receive other wireless signals (e.g., near-field signals), or any other desired components.

Stylus 10 may include a metal tube or other conductive components in shaft 16. The metal tube or other structures in stylus 10 may serve as an antenna ground for an antenna. The metal tube may also be used to ground components for sensors located at end 18 of stylus 10. An antenna resonating element for the antenna may be formed from metal traces on a printed circuit or other dielectric support structure and/or from other conductive structures. As an example, an antenna resonating element may be at end 18 of stylus 10.

Figure 2:
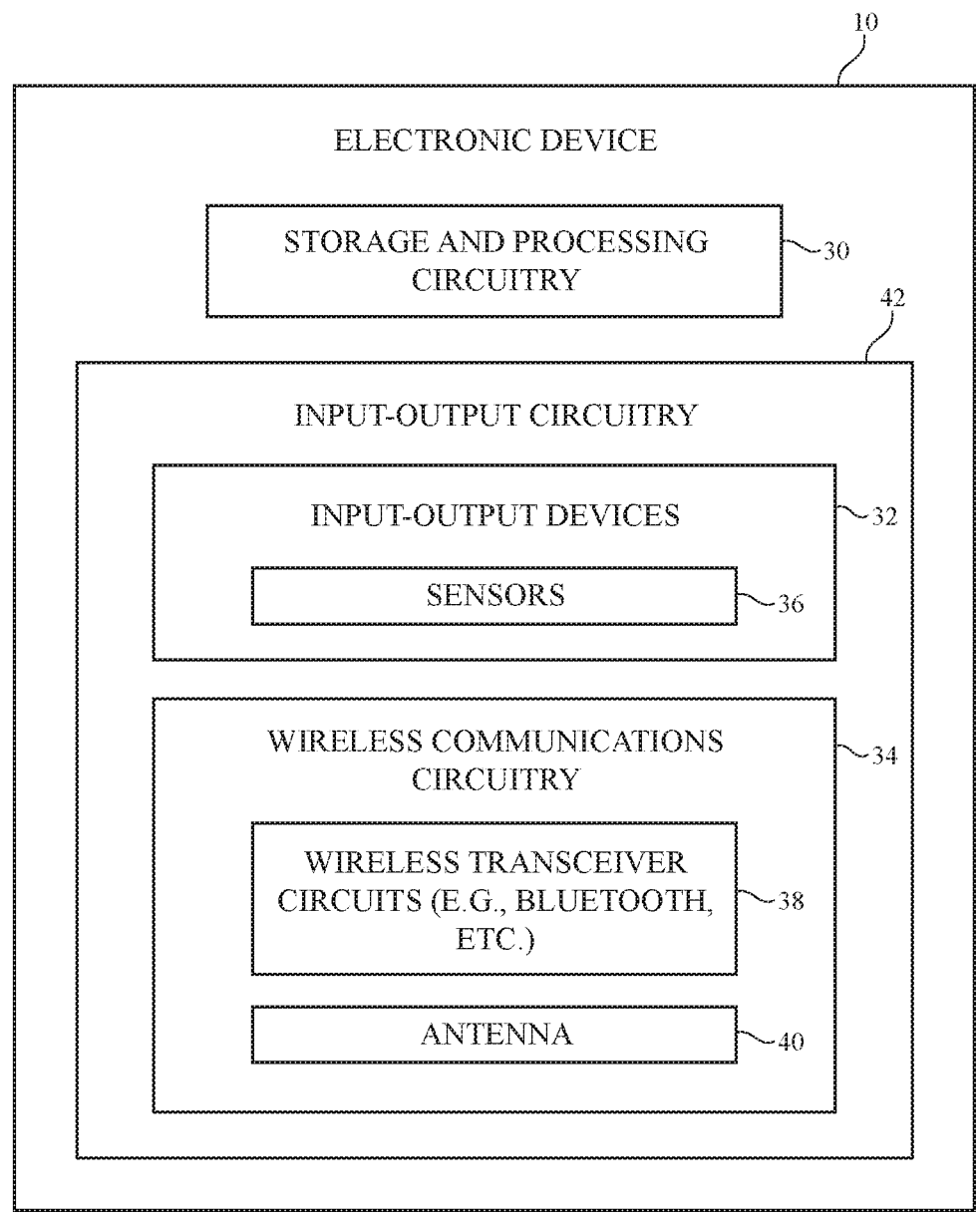
FIG. 2 is a schematic diagram of an illustrative stylus with wireless communications circuitry in accordance with some embodiments.

A schematic diagram showing illustrative components that may be used in stylus 10 is shown in FIG. 2. As shown in FIG. 2, stylus 10 may include control circuitry such as storage and processing circuitry 30. Storage and processing circuitry 30 may include storage such as nonvolatile memory (e.g., flash memory or other electrically-programmable-read-only memory configured to form a solid-state drive), volatile memory (e.g., static or dynamic random-access-memory), etc. Processing circuitry in storage and processing circuitry 30 may be used to control the operation of stylus 10. This processing circuitry may be based on one or more microprocessors, microcontrollers, digital signal processors, baseband processor integrated circuits, application specific integrated circuits, etc.

Storage and processing circuitry 30 may be used to run software on stylus 10. The software may process input from buttons, sensors, and other input components. The software may also be used to provide output to a user (e.g., using light-emitting-diodes or other output components such as components 8 of FIG. 1). To support interactions with external equipment such as tablet computer 20, storage and processing circuitry 30 and other circuitry in stylus 10 may be used in implementing communications protocols. Communications protocols that may be implemented in stylus 10 include protocols for short-range wireless communications links such as the Bluetooth® protocol, NFC protocol, or other wireless personal area network (WPAN) protocols. If desired, other types of wireless communications links may be supported (e.g., wireless local area network (WLAN) communications links, satellite navigation links, etc.). The use of Bluetooth communications is merely illustrative.

Stylus 10 may include input-output circuitry 42. Input-output circuitry 42 may include input-output devices 32. Input-output devices 32 may be used to allow data to be supplied to stylus 10 and to allow data to be provided from stylus 10 to external devices such as tablet computer 20 (FIG. 1). Input-output devices 32 may include user interface devices, data port devices, and other input-output components. For example, input-output devices 32 may include touch screens, displays without touch sensor capabilities, buttons, joysticks, scrolling wheels, touch pads, microphones, cameras, speakers, status indicators, light sources, audio jacks and other audio port components, digital data port devices, light sensors, accelerometers or other components that can detect motion and stylus orientation relative to the Earth, or other input-output components.

If desired, input-output devices 32 may include one or more sensors 36 such as capacitance sensors, proximity sensors (e.g., a capacitive proximity sensor and/or an infrared proximity sensor), magnetic sensors, and/or force sensors. Sensors 36 may be mounted at end 18 of stylus 10 (FIG. 1) and may gather corresponding sensor data. Sensors 36 may, for example, sense the presence of display 24 and/or how stylus 10 is being used to interact with display 24 when end 18 is pointed towards or contacting the surface of display 24. Sensors 36 may also gather sensor data indicative to how a user is holding or interacting with stylus 10 (e.g., touch sensor or proximity sensor data indicative of whether or not a user is touching end 18 of stylus 10, force sensor data indicative of how hard a user is pressing against end 18 of stylus 10 with their hand, etc.). This sensor data may be conveyed to tablet computer 20 over wireless link 28 (FIG. 1) for further processing if desired.

As shown in FIG. 2, input-output circuitry 42 may include wireless communications circuitry 34 for communicating wirelessly with external equipment. Wireless communications circuitry 34 may include radio-frequency transceiver circuitry formed from one or more integrated circuits, power amplifier circuitry, low-noise input amplifiers, passive radio-frequency components, matching circuitry, one or more antennas 40, radio-frequency transmission line paths, and other circuitry for handling radio-frequency wireless signals.

Wireless communications circuitry 34 may include radio-frequency transceiver circuitry 38 for handling wireless communications in the 2.4 GHz Bluetooth® communications band or other suitable communications bands (e.g., WPAN communications bands, WLAN communications hands, etc.). Bluetooth signals or other wireless signals may be transmitted and/or received by transceiver circuitry 38 using one or more antennas such as antenna 40. Antennas in wireless communications circuitry 34 may be formed using any suitable antenna types. For example, antennas for stylus 10 may include antennas with resonating elements that are formed from loop antenna structures, patch antenna structures, inverted-F antenna structures, slot antenna structures, planar inverted-F antenna structures, helical antenna structures, ring antenna structures, monopole antenna structures, dipole antenna structures, hybrids of these designs, etc. If desired, one or more of the antennas in stylus 10 may be cavity-backed antennas.

Transmission line paths may be used to couple antenna 40 to transceiver circuitry 38. Transmission line paths in stylus 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission line paths, if desired.

Figure 3:
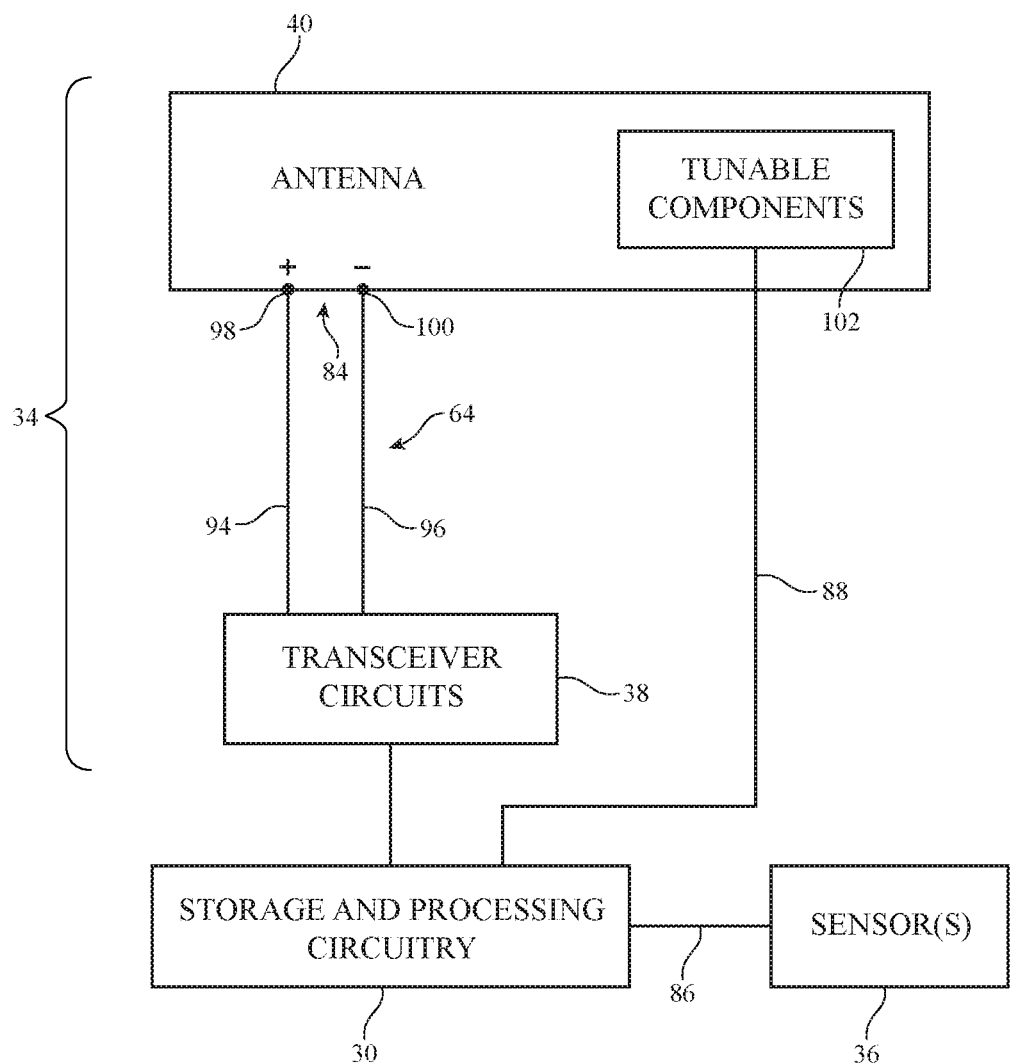
FIG. 3 is a diagram of illustrative wireless circuitry for use in a stylus in accordance with some embodiments.

As shown in FIG. 3, transceiver circuitry 38 in wireless communications circuitry 34 may be coupled to antenna 40 using paths such as transmission line path 64. Wireless communications circuitry 34 may be coupled to storage and processing circuitry 30. Storage and processing circuitry 30 may be coupled to sensors 36 over paths such as sensor data path 86.

Sensor data path 86 may include one or more conductive lines (e.g., conductive traces, wires, or other conductors) for coupling sensors 36 to storage and processing circuitry 30. For example, sensor data path 86 may include one or more sensor data conductors that convey sensor signals gathered by sensors 36 to storage and processing circuitry 30 and one or more ground conductors that are coupled to ground in stylus 10. Sensor signals conveyed over sensor data path 86 may include alternating current signals provided at frequencies that are much lower than the radio-frequencies handled by transceiver circuitry 38 (e.g., between 1 MHz and 5 MHz, below 1 MHz, or any other desired frequency below 600 MHz). Storage and processing circuitry 30 may also be coupled to other input-output devices 32 (FIG. 2) over respective data paths.

To provide antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna).

If desired, antenna 40 may be provided with adjustable circuits such as tunable components 102 to tune antenna 40 over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of stylus 10, storage and processing circuitry 30 may issue control signals on one or more paths such as control path 88 that adjust inductance values, capacitance values, or other parameters associated with tunable components 102, thereby tuning antenna 40 to cover desired communications bands. Configurations in which antenna 40 is free of tunable components may also be used.

Transceiver circuitry 38 may be coupled to antenna 40 over a signal path such as transmission line path 64. Transmission line path 64 may include one or more radio-frequency transmission lines. As an example, transmission line path 64 of FIG. 3 may be a radio-frequency transmission line having a positive signal conductor such as positive signal conductor (line) 94 and a ground signal conductor such as ground conductor (line) 96. Conductors 94 and 96 may form parts of a coaxial cable or a microstrip transmission line (as examples). A matching network formed from components such as inductors, resistors, and capacitors may be used in matching the impedance of antenna 40 to the impedance of transmission line path 64. Matching network components may be provided as discrete components (e.g., surface mount technology components) or may be formed from housing structures, printed circuit board structures, traces on plastic supports, etc. Components such as these may also be used in forming filter circuitry in antenna 40.

Transmission line path 64 may be coupled to antenna feed structures associated with antenna 40. As an example, antenna 40 may form an inverted-F antenna, a slot antenna, a hybrid inverted-F slot antenna or other antenna having an antenna feed 84 with a positive antenna feed terminal such as terminal 98 and a ground antenna feed terminal such as terminal 100. Positive signal conductor 94 may be coupled to positive antenna feed terminal 98 and ground conductor 96 may be coupled to ground antenna feed terminal 100. Other types of antenna feed arrangements may be used if desired. The illustrative feeding configuration of FIG. 3 is merely illustrative.

Storage and processing circuitry 30 may use the sensor signals gathered by sensors 36 and received over sensor data path 86 to perform any desired operations on device 10. For example, storage and processing circuitry 30 may control other input-output devices 32 (FIG. 2) based on the sensor signals. In another suitable arrangement, storage and processing circuitry 30 may adjust antenna 40 (e.g., using control signals provided to tunable components 102 over control path 88) based on the sensor signals. Storage and processing circuitry 30 may generate sensor data based on the sensor signals received over sensor data path 86. Storage and processing circuitry 30 may transmit the sensor data to transceiver circuitry 38. Transceiver circuitry 38 may generate radio-frequency sensor data based on the sensor data received from storage and processing circuitry 30. Transceiver circuitry 38 may use antenna 40 to transmit the radio-frequency sensor data to tablet computer 20 over wireless link 28 (FIG. 1).

Transmission line paths in device 10 such as transmission line path 64 may be integrated into rigid and/or flexible printed circuit boards. In one suitable arrangement, transmission line paths such as transmission line path 64 may also include transmission line conductors (e.g., positive signal conductors 94 and ground conductors 96) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
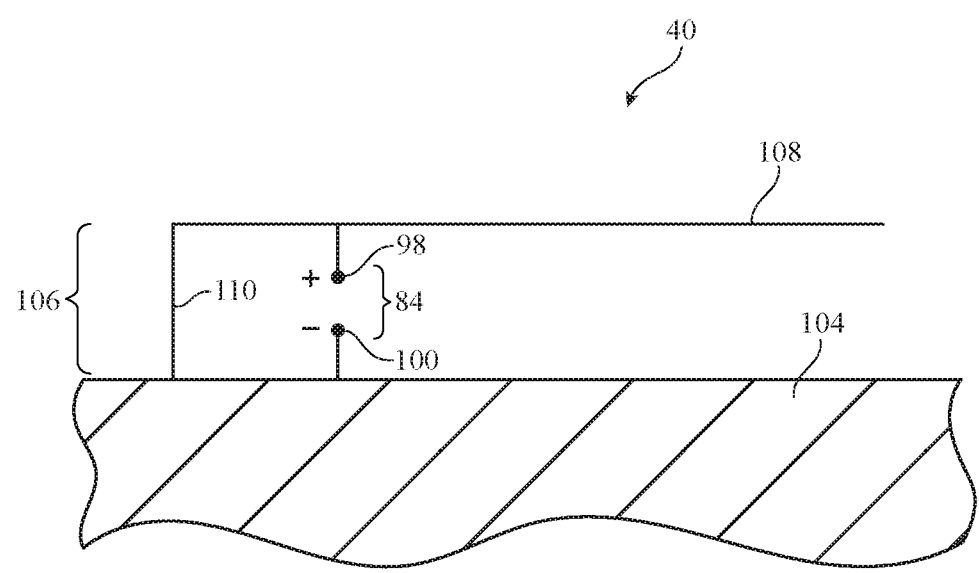
FIG. 4 is a diagram of an illustrative inverted-F antenna for a stylus in accordance with some embodiments.

FIG. 4 is a diagram of illustrative inverted-F antenna structures that may be used in implementing antenna 40 for stylus 10. Inverted-F antenna 40 of FIG. 4 has antenna resonating element 106 and antenna ground 104 (sometimes referred to herein as ground structures 104, ground plane 104, or ground 104). Antenna resonating element 106 (sometimes referred to herein as antenna radiating element 106) may have a main resonating element arm such as arm 108 (sometimes referred to herein as antenna resonating element arm 108, antenna radiating element arm 108, radiating arm 108, or arm 108). The length of antenna resonating element arm 108 may be selected so that antenna 40 resonates at desired operating frequencies. For example, the length of antenna resonating element arm 108 may be a quarter of a wavelength at a desired operating frequency for antenna 40 (e.g., 2.4 GHz). Antenna 40 may also exhibit resonances at harmonic frequencies.

Antenna resonating element arm 108 may be coupled to ground 104 by return path 110. Antenna feed 84 may include positive antenna feed terminal 98 and ground antenna feed terminal 100 and may run parallel to return path 110 between antenna resonating element arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components such as components 102 of FIG. 3 to support antenna tuning, etc.). Antenna resonating element arm 108 may follow a meandering path or may have other shapes if desired (e.g., shapes having curved and/or straight segments).

In mounting antenna 40 in stylus 10, the structures of antenna 40 may be curved. For example, ground 104 and/or antenna resonating element 106 may be formed from metal that wraps around longitudinal axis 12 of stylus 10 (FIG. 1). Ground 104 and/or antenna resonating element 106 may be curved in three-dimensions (e.g., ground 104 and/or antenna resonating element 106 may be formed from conductive traces having a concave shape or dome-shape that extends over end 18 of stylus 10 as shown in FIG. 1). The example of FIG. 4 is merely illustrative and, if desired, antenna 40 may be implemented using other types of antenna structures.

Antenna 40 may be formed from conductive structures such as metal structures. The metal structures of antenna 40 may be metal coating layers, portions of a device housing or other structural metal member, portions of a metal tube, metal foil, wires, or other metal structures.

Figure 5:
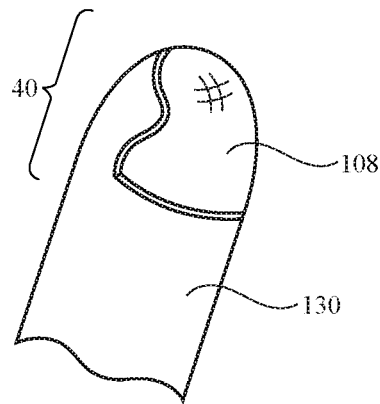
FIG. 5 is a perspective view of an illustrative antenna formed using laser direct structuring techniques in accordance with some embodiments.

In the illustrative configuration of FIG. 5, antenna 40 includes three-dimensional metal antenna resonating element arm 108 on three-dimensional (non-planar) dielectric support 130. Dielectric support 130 may be, for example, a support formed from a dielectric such as plastic (e.g., molded plastic). The plastic material that forms support 130 may be provided with metal particles or other filler material that sensitizes support 130 to exposure from laser light. Following exposure to laser light, portions of support 130 that have been exposed to laser light will promote coating with electroplated metal, whereas portions of support 130 that have not been exposed to laser light will not promote electroplating metal growth. With this approach, which may sometimes be referred to as laser direct structuring (LDS), metal structures such as metal antenna resonating element arm 108 of FIG. 5 may be deposited using electroplating. The metal antenna structures that are grown in this way can be three-dimensional (i.e., a curved surface such as the curved surface of illustrative support structure 130 of FIG. 5 can be coated with metal). Use of a three-dimensional antenna structure may help create a desired antenna radiation pattern for antenna 40 while accommodating antenna 40 within a housing of a desired shape.

Figure 6:
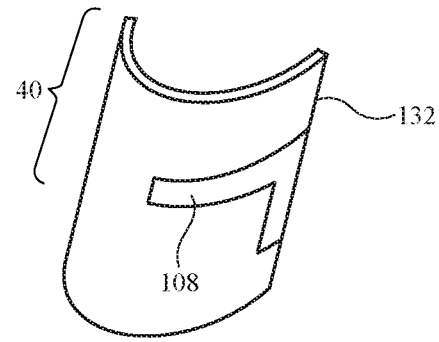
FIG. 6 is a perspective view of an illustrative flexible printed circuit antenna in accordance with some embodiments.

In the example of FIG. 6, metal traces for antenna resonating element arm 108 have been deposited and patterned on a flexible substrate such as flexible substrate 132. The metal for forming antenna structures such as antenna resonating element arm 108 can be deposited as a blanket metal coating and subsequently patterned using photolithography and metal etching (as an example). Flexible substrate 132 may be a flexible printed circuit formed from a polyimide substrate or a flexible layer of other polymer material. When installed in stylus 10, flexible substrate 132 may wrapped around the elongated body of stylus 10 (e.g., around longitudinal axis 12 of FIG. 1).

Figure 7:
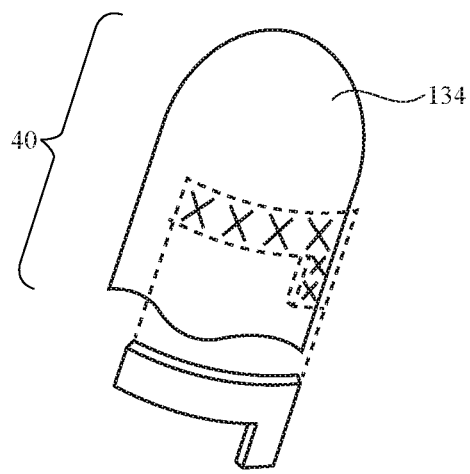
FIG. 7 is a perspective view of an illustrative antenna with a metal resonating element mounted to a support structure in accordance with some embodiments.

FIG. 7 is an exploded perspective view of an illustrative antenna resonating element arm 108 for antenna 40 that is formed from a metal member (e.g., stamped metal foil, etc.) that is attached to dielectric support member 134 using adhesive 136. Support member 134 may be formed from plastic or other dielectric materials and may form a portion of the elongated body of stylus 10.

Figure 8:
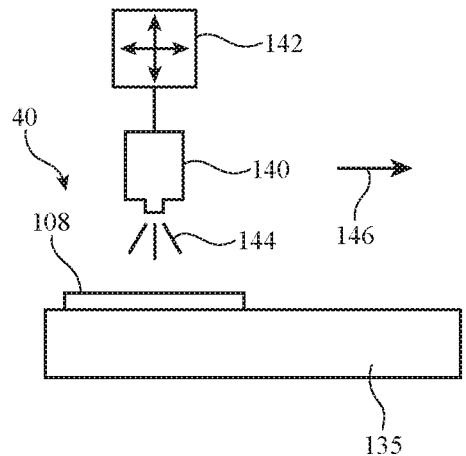
FIG. 8 is a cross-sectional side view of an illustrative antenna formed from printed conductive ink in accordance with some embodiments.

FIG. 8 is a diagram showing how metal antenna resonating element arm 108 and other antenna structures may be formed by printing conductive ink 144 onto the surface of dielectric support 138. Dielectric support 138 may be a planar substrate such as a printed circuit substrate or may be a molded plastic support or other structure that has a three-dimensional shape. Inkjet dispenser 140 may be controlled using computer-controlled positioner 142. When moved in direction 146, dispenser 140 may deposit metal ink or other conductive ink 144 onto support structure 138, thereby forming a desired shape for antenna resonating element arm 108 of antenna 40. Conductive ink (e.g., binder material that contains metal particles or other conductive particles) may be applied to a support structure using ink-jet printing, screen printing, pad printing, spraying, dipping, dripping, painting, or other suitable deposition techniques.

The antenna metal structure fabrication techniques described in connection with FIGS. 5-8 are merely illustrative. Antenna structures may be formed from portions of metal housings (e.g., metal tubes that form structures for the elongated body of stylus 10), internal metal members, metal traces on flexible printed circuits, three-dimensional metal traces (e.g., laser patterned traces) on molded plastic substrates and other three-dimensional dielectric substrates, metal wires, metal foil (e.g., metal foil that has been patterned into the shape of an antenna structure and that is attached to a support structure using adhesive, screws, or other attachment mechanisms).

Figure 9:
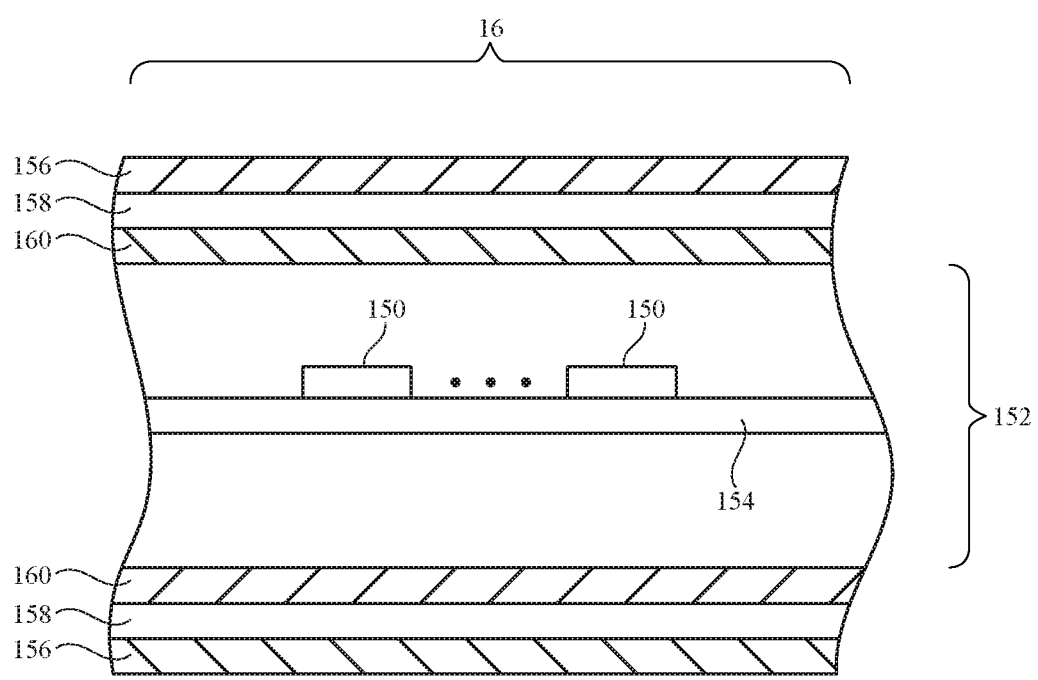
FIG. 9 is a cross-sectional side view of a portion of an elongated body for a stylus in accordance with some embodiments.

The housing of stylus 10 may be formed from metal, plastic, carbon-fiber composites and other fiber composites, glass, ceramic, other materials, and combinations of these materials. A cross-sectional side view of a shaft 16 of the elongated body of stylus 10 (FIG. 1) is shown in FIG. 9. As shown in FIG. 9, electrical components 150 may be mounted within interior cavity 152 of the elongated body of stylus 10. Components 150 may include integrated circuits, sensors, battery structures, connectors, switches, and other circuitry (e.g., storage and processing circuitry 30 and/or input-output circuitry 42 of FIG. 2). Components 150 may be mounted on one or more substrates such as substrate 154. Substrate 154 may be a dielectric support structure such as a printed circuit (e.g., a rigid printed circuit formed from a rigid printed circuit board material such as fiberglass-filled epoxy or a flexible printed circuit formed from a flexible sheet of polyimide or other flexible polymer layer).

Interior cavity 152 may be surrounded by one or more layers of material such as layers 156, 158, and 160. These layers of material may form concentric cylindrical tubes and may be formed from metal, plastic, glass, ceramic, other materials, and/or two or more of these materials. As an example, outer layer 156 may form a plastic tube that serves as a cosmetic exterior for stylus 10, intermediate layer 158 may form a metal tube that provides stylus 10 with structural support, and inner layer 160 may form a plastic tube that serves as a support structure. In general, layer 156 may be formed from metal, plastic, carbon fiber, ceramic, or other materials, layer 158 may be formed from metal, plastic, carbon fiber, ceramic, or other materials, and layer 160 may be formed from metal, plastic, carbon fiber, ceramic, or other materials. With another illustrative arrangement, inner layer 160 may be omitted, layer 156 may be formed from metal, plastic, or other materials and layer 158 may be formed from metal, plastic, or other materials. Configurations in which shaft 16 includes a single tube or includes solid portions without significant interior cavity portions may also be used.

If desired, layers 156, 158, and 160 may be tubular but not completely concentric. As an example, layer 158 may have a shape that accommodates for other components in stylus 10, such as a cylindrical shape with a flattened surface extending along the longitudinal axis, a cylindrical shape having windows or cavity portions extending along the longitudinal axis, etc.

Figure 10:
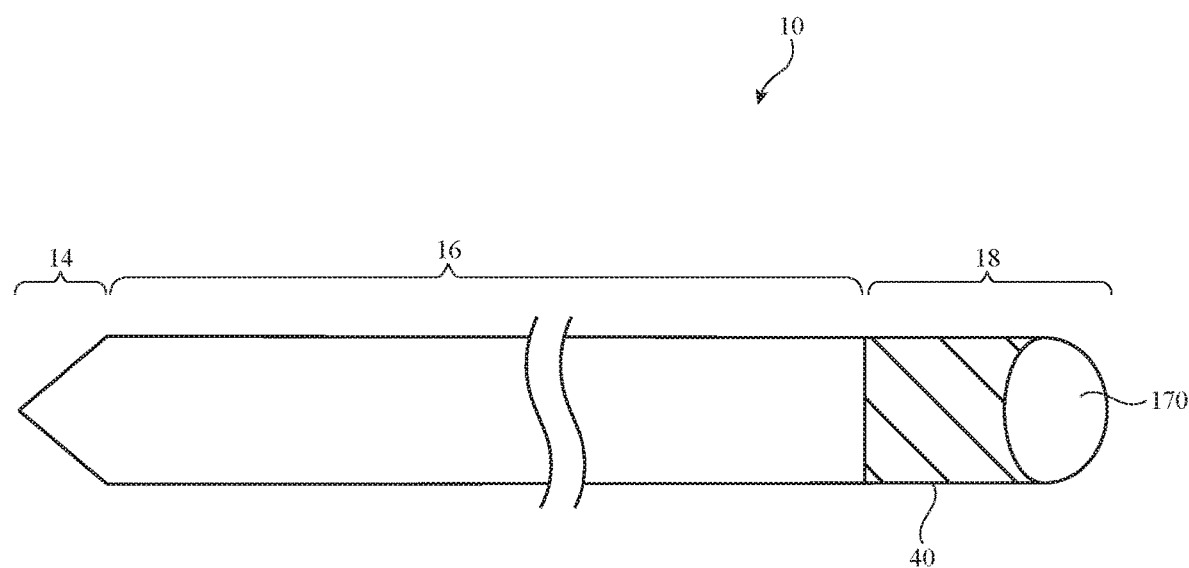
FIG. 10 is a side view of an illustrative stylus having a tip and an opposing end at which an antenna and a cap structure have been formed in accordance with some embodiments.

As shown in the side view of stylus 10 of FIG. 10, antenna 40 may be formed at end 18 of stylus 10. With this type of arrangement, the risk of inadvertently blocking antenna 40 with the hand of a user may be minimized. Antenna 40 may be formed using metal structure at end 18 of stylus 10 (e.g., metal structures such as conductive traces on an underlying substrate or other metal structures as described above in connection with FIGS. 5-8). The metal structures used form antenna 40 may include, for example, conductive traces that form antenna resonating element 106 of FIG. 4, antenna ground 104 of FIG. 4, and/or any other antenna structures.

If care is not taken, metal structures in stylus 10 may interfere with the operation of antenna 40. Other limitation such as the compactness of stylus 10 may also restrict the configuration of antenna 40 in stylus 10. To provide satisfactory antenna performance, stylus 10 may include antenna 40 that is integrated with (e.g., have common shared structures with, overlaps with, surrounded by, coupled to, etc.) other portions of stylus 10. As an example, stylus 10 may include cap structure 170 (sometimes referred to herein as a cap) formed at end 18. If desired, cap structure 170 may be integrated with antenna 40 (e.g., integrated with an antenna carrier on which antenna traces for antenna 40 are formed). In other words, portions of cap structure 170 may overlap portions of antenna 40. If desired, portions of cap structure 170 may enhance the performance of antenna 40 (e.g., serve as a reflector for antenna 40 to direct antenna signals in a particular direction), may encase antenna 40 to protect antenna 40 from contaminants, may surround antenna 40 to form a compact integrated structure, etc.

If desired, antenna 40 may also be coupled with (e.g., integrated with or share integral structures with) other structures in stylus 10 such as one or more of layers 156, 158, 160 (FIG. 9), components 8 (FIG. 1), sensors 36 (FIG. 2), etc. In particular, the metal structures that form the antenna ground for antenna 40 may be shorted (e.g., grounded) to layer 158 (FIG. 9) in scenarios where layer 158 is formed from metal. Layer 158 may sometimes be referred to herein as metal tube 158. However, if desired, layer 158 may be formed from any other material such as a non-metallic conductive structure, may be a non-cylindrical structure, etc.

Figure 11:
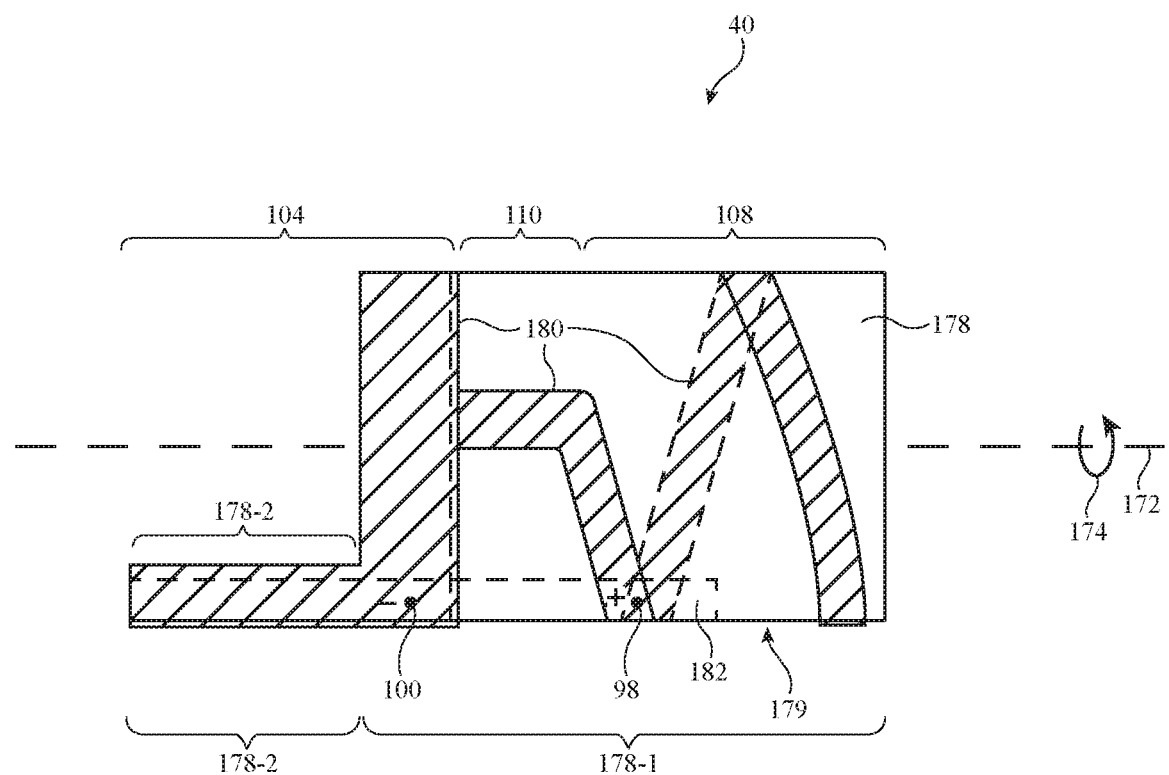
FIG. 11 is a side view of an illustrative antenna formed from conductive traces that surround an antenna carrier in accordance with some embodiments.

FIG. 11 is a side view of an illustrative antenna (e.g., antenna 40 in stylus 10). In particular, antenna 40 may be formed from conductive traces 180 on an antenna carrier 178 (sometimes referred to herein as a substrate, a support structure, a dielectric support structure, or an antenna support structure). Antenna carrier 178 may be formed from a single block of dielectric material, a combination of two or more dielectric materials of different types, or may be formed at least partially from materials that are not dielectric materials. Antenna carrier 178 may have a cylindrical shape, a rectangular shape, an elongated shape, an irregular shape that is a combination of two or more shapes, or may have any other desired shapes. In the example of FIG. 11, antenna carrier 178 has a cylindrical antenna carrier portion 178-1 extending along longitudinal axis 172 with a flat rectangular surface 179 on one side of the cylindrical antenna carrier portion. Antenna carrier 178 may have a protruding rectangular portion such as protruding antenna carrier portion 178-2 that extends from an end of cylindrical antenna carrier portion 178-1 along longitudinal axis 172. Cylindrical antenna carrier portion 178-1 and protruding antenna carrier portion 178-2 may share flat rectangular surface 179. In other words, antenna carrier 178 may have a length that extends across antenna carrier portions 178-1 and 178-2 along longitudinal axis 172. Antenna carrier 178 may also have one or more different circumferences about longitudinal axis 172 (e.g., a circumference for cylindrical antenna carrier portion 178-1). The circumference (perimeter) may be circular, have one or more curved portions and one or more straight portions, or may have only straight portions (e.g., cylindrical antenna carrier portion 178-1 need not be perfectly cylindrical). As an example, longitudinal axis 172 for antenna carrier 178 may be aligned with or parallel to longitudinal axis 12 for stylus 10 (FIG. 1). This is merely illustrative. If desired, antenna carrier 178 may have any suitable shape and may have one or more recesses and/or protrusions.

As an example, conductive traces 180 may be formed using LDS (e.g., some or all of conductive traces 180 may be deposited by electroplating metal directly onto antenna carrier 178) In particular, conductive traces 180 may form at least a portion of antenna ground 104. A first portion of antenna ground 104 may be formed on cylindrical antenna carrier portion 178-1. A second portion of antenna ground 104 may be formed on protruding antenna carrier portion 178-2. Allowing antenna ground 104 to extend onto protruding antenna carrier portion 178-2 can provide improved grounding properties for antenna 40 and can facilitate connection to other grounding structures and/or transmission line structures in stylus 10 relative to scenarios in which antenna ground 104 is only formed on cylindrical antenna carrier portion 178-1, for example. However, this is merely illustrative. If desired, antenna ground 104 may be formed entirely on cylindrical antenna carrier portion 178-1 or entirely on protruding antenna carrier portion 178-2.

Conductive traces 180 may form antenna resonating element arm 108. Antenna resonating element arm 108 may surround antenna carrier 178 (e.g., at cylindrical antenna carrier portion 178-1) and may extend around the circumference of antenna carrier 178 while also extending along longitudinal axis 172 (e.g., in a winding, spiral or helical pattern). In other words, resonating element arm 108 may form a helical structure that wraps around antenna carrier 178 at least once. Conductive traces 180 may form return path 110 that couples antenna ground 104 to antenna resonating element arm 108. As an example, return path 110 may extend along longitudinal axis 172 of antenna carrier 178 and may be formed on a curved surface of antenna carrier 178. Antenna 40 may include antenna feeds such as positive antenna feed terminal 98 and ground antenna feed terminal 100. If desired, a groove such as groove 182 may be formed in antenna carrier 178 (e.g., extending along longitudinal axis 172). Positive antenna feed terminal 98 may be coupled to antenna resonating element arm 108 at groove 182. Ground antenna feed terminal 100 may be coupled to antenna ground 104 at groove 182. If desired, multiple ground antenna feed terminals may be coupled to antenna ground 104 at respective locations along groove 182. If desired, other components may extend along groove 182. Groove 182 may extend only partially along the length of antenna carrier 178 if desired, as shown in FIG. 11. Alternatively, if desired, groove 182 may extend completely along the length of antenna carrier 178.

Figure 12A:
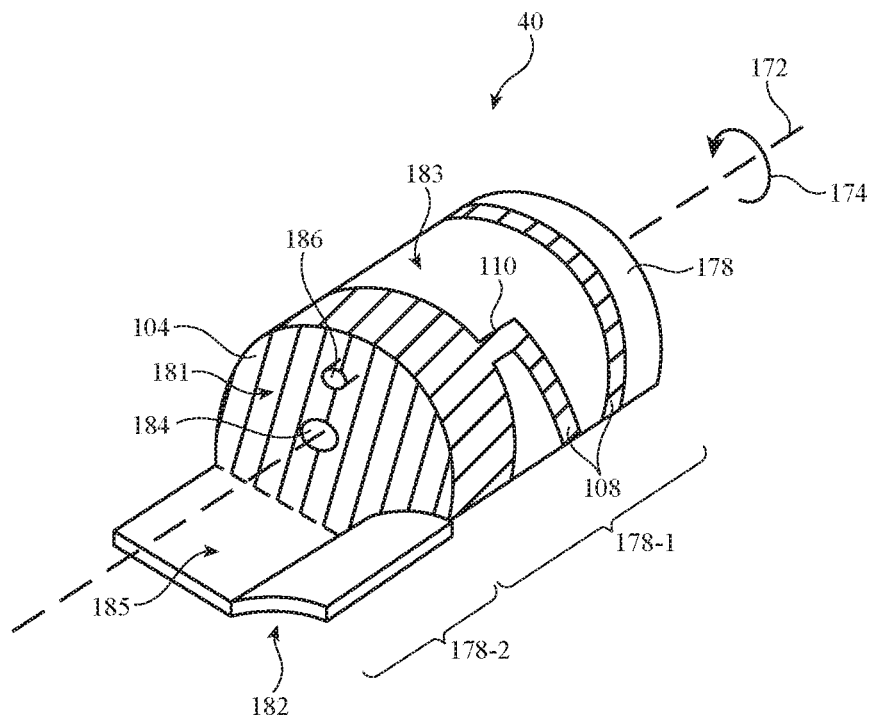
FIGS. 12A and 12B are two perspective views of an illustrative antenna formed from conductive traces that surround an antenna carrier in accordance with some embodiments.
Figure 12B:
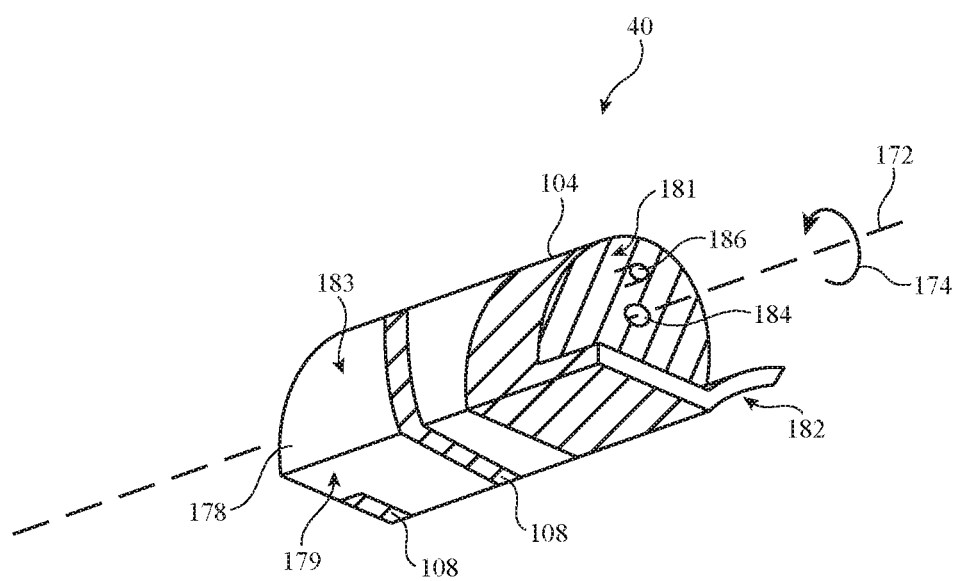

FIGS. 12A and 12B are perspective views of antenna 40 on antenna carrier 178. In particular, antenna carrier 178 may have surfaces 179, 181, 183, and 185. As shown in FIGS. 12A and 12B, surfaces 179, 183, and 185 may each extend along longitudinal axis 172, whereas surface 181 may be oriented perpendicular to longitudinal axis 172. As shown in FIGS. 12A and 12B, antenna ground 104 may be formed on surfaces that extend along longitudinal axis 172 such as surface 179 and surface 183 adjacent to surface 179. Antenna ground 104 may also be formed on surfaces that are perpendicular to longitudinal axis 172 such as surface 181. In other words, antenna ground 104 may completely cover one end of antenna carrier portion 178-1. The example of FIGS. 12A and 12B in which antenna ground 104 is formed on surfaces 179, 181, 183, but not on surface 185 that opposes surface 179, is merely illustrative. If desired, antenna ground 104 may be formed on only one surface of antenna carrier 178, only two surfaces of antenna carrier 178, or three or more surfaces of antenna carrier 178.

Antenna resonating element arm 108 may be formed on surfaces 183 and 179 of antenna carrier portion 178-1. In particular, antenna resonating element 108 may wrap around antenna carrier 178 along surfaces 179 and 183. Surfaces 179 and 183 may define a circumference (perimeter) of antenna carrier 178 about longitudinal axis 172. If desired, resonating element arm 108 may extend more than 360 degrees in rotational direction 174 about longitudinal axis 172 (e.g., arm 108 may have a length longer than the circumference of antenna carrier 178), may extend more than 180 degrees in rotational direction 174 about longitudinal axis 172, etc. This is merely illustrative. If desired, resonating element arm 108 may only partially wrap around antenna carrier 178 (e.g., may extend less than 360 degrees in rotational direction 174 about longitudinal axis 172), may wrap around antenna carrier 178 more than once, more than twice, or more than three times, more than once but less than twice (e.g., may extend more than 360 degrees but less than 720 degree about longitudinal axis 172), etc.

Antenna resonating element arm 108 and antenna ground 104 may be formed at opposing ends of antenna carrier 178. In particular, one end of antenna resonating element arm 108 may be connected to antenna ground 104 using return path 110 (e.g., on surface 183). Antenna resonating element arm 108 may extend downward on one side of antenna carrier 178 on surface 183, across surface 179, upward on the opposing side of antenna carrier 178 on surface 183, downward on the one side of antenna carrier 178 a second time on surface 183, and partially across surface 179. Antenna resonating element arm 108 may terminate at surface 179. This is merely illustrative. If desired, antenna resonating element arm 108 may terminate on any side of antenna carrier 178 and/or any surface of antenna carrier 178. If desired, antenna resonating element arm 108 may extend from return path 110 in an opposite direction than as depicted in FIGS. 12A and 12B. Because antenna resonating element arm 108 extends in a helical pattern around antenna carrier 178, antenna 40 may sometimes be referred to herein as a helical antenna with a return path or a helical-type IFA antenna.

Groove 182 in antenna carrier 178 (FIG. 11) may extend at least partially through the length of antenna carrier 178. Surfaces 179 and 185 may have a curved portion that defines a shape of groove 182. If desired, groove 182 may be formed at the interface between surface 179 and surface 183.

Antenna carrier 178 may have a protrusion on surface 181 (e.g. alignment pin 186) and a depression on surface 181 (e.g., hole 184). Alignment pin 186 may align antenna carrier 178 to other structures (e.g., additional grounding structures connected to antenna ground 104 form from conductive traces 180). Hole 184 may accommodate a screw used to connect the other structures to antenna carrier 178 at the end where antenna ground conductive traces are formed.

Figure 13:
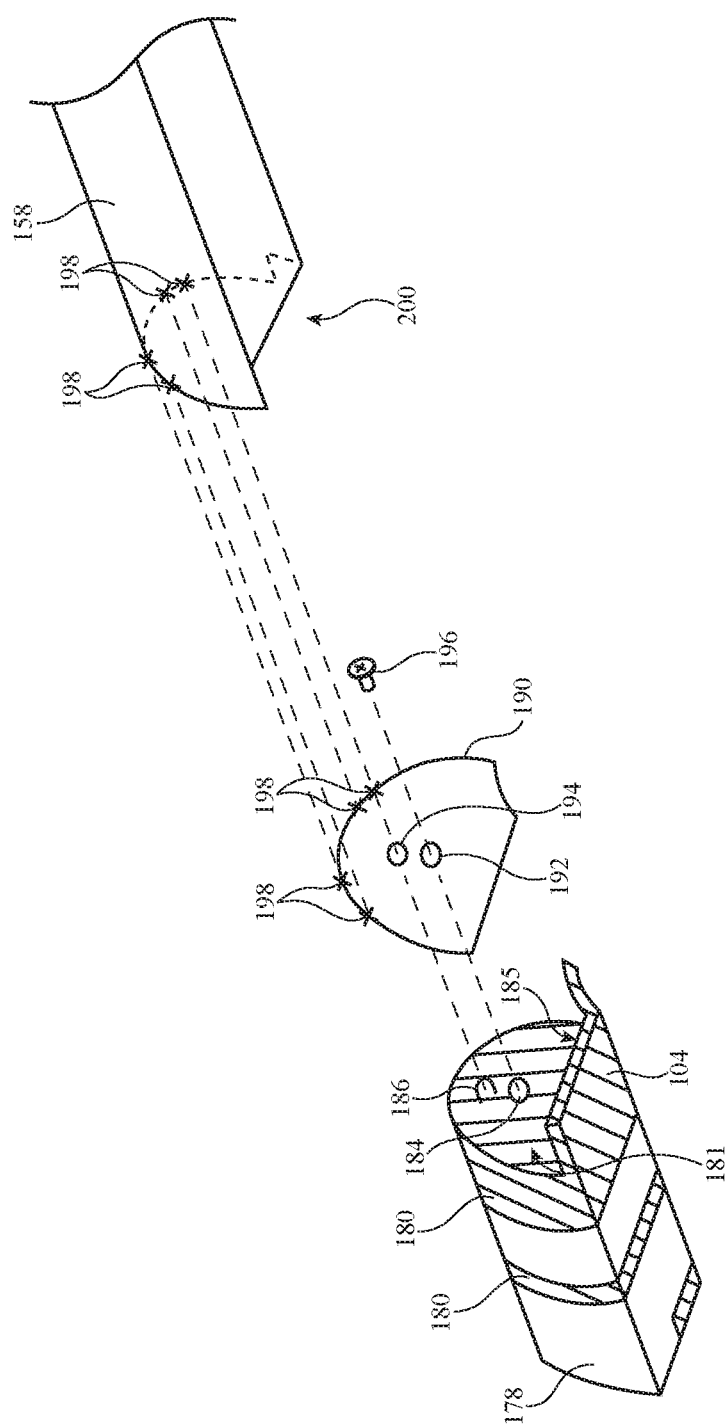
FIG. 13 is a perspective view of an antenna carrier coupled to grounding structures in a stylus in accordance with some embodiments.

FIG. 13 is an exploded perspective view of an antenna having an antenna ground coupled to grounding structures in a stylus. As shown in FIG. 13 and described previously in connection with FIGS. 11, 12A, and 12B, antenna ground 104 includes a portion of conductive traces 180 on an antenna carrier 178. The conductive traces 180 that form antenna ground 104 may be coupled to a tubular metal structure such as metal tube 158 and an interposing metal layer such as metal plate 190. In particular, metal layer 190 (sometimes referred to herein as a metal plate or a flange) may have openings 192 and 194, which align with hole 184 and alignment pin 186, respectively. Metal layer 190 may have a shape that mates with surface 181 and may have an outline that follows a cross-sectional footprint of antenna carrier 178. An attachment structure such as a fastener (e.g., screw 196) may extend through opening 192 to hole 184. The fastener may bias metal layer 190 against surface 181 of antenna carrier 178. In this configuration, metal layer 190 may lie on top of surface 185 of antenna carrier 178. However, this is merely illustrative.

Metal layer 190 may be attached to metal tube 158 at attachment points 198. As an example, metal layer 190 may be welded to metal tube 158 at welding points along the circular outline of metal layer 190 and metal tube 158 (e.g., at points 198, at additional points along the perimeter of metal layer 190 and at corresponding points along the end of metal tube 158).

Metal tube 158 may have an opening (e.g., opening 200) at the bottom side of the end of metal tube 158. Opening 200 may accommodate antenna carrier portion 178-2. The attachment and alignment structures described in FIG. 13 are merely illustrative. If desired, metal layer 190, metal tube 158, and antenna carrier 178 may be attached at any suitable location and using any suitable structures such as solder, adhesive, pins, springs, etc.

Figure 14:
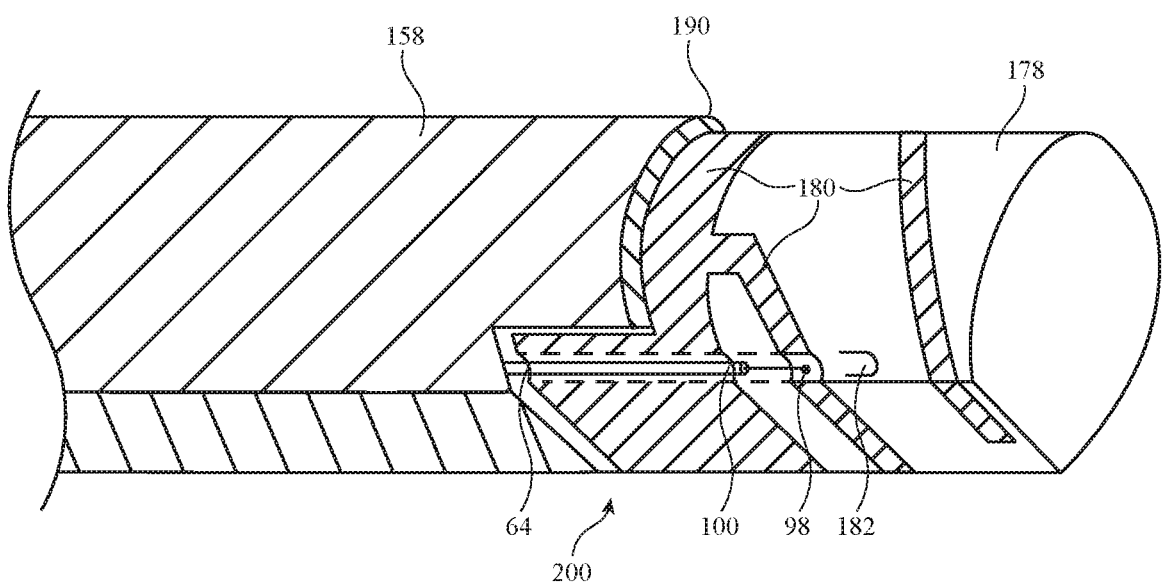
FIG. 14 is a perspective view of an assembled antenna in a stylus in accordance with some embodiments.

FIG. 14 is a perspective view of antenna 40 assembled with grounding structures and other structures in a stylus (e.g., by collapsing the exploded view of FIG. 13). As shown in FIG. 14, metal layer 190 may be interposed between metal tube 158 and antenna carrier 178. In particular, metal layer 190 may electrically connect the antenna ground portions of conductive traces 180 on antenna carrier 178 to metal tube 158. Metal tube 158 may span the length of shaft portion 16 in stylus 10, as an example. Wireless communications circuitry 34 such as transceiver circuits 38 in FIG. 2 may be provided on the interior of metal tube 158 (e.g., on a substrate within interior cavity 152 in FIG. 9). Transmission line structures such as transmission line path 64 may extend from wireless transceiver circuits 38, along metal tube 158, and to conductive traces 180 on antenna carrier 178. Transmission line path 64 may extend along and within groove 182 in antenna carrier 178. As an example, transmission line path 64 may be a transmission line having a ground signal conductor. The ground signal conductor may be coupled to ground feed terminal 100. The ground signal conductor may be connected to multiple points in groove 182 along the antenna ground portion of conductive traces 180. The transmission line may have a positive signal conductor. The positive signal conductor may be coupled to the positive feed terminal 98 along the antenna resonating element arm portion of conductive traces 180.

Opening 200 in metal tube 158 may serve as a window that exposes the antenna ground portion of conductive traces 180 (e.g., along antenna carrier portion 178-2). In other words, metal tube 158 may be non-overlapping with respective to any part of the antenna ground portion of conductive traces 180. As an example, opening 200 may be formed at an end of metal tube 158. Additionally, metal plate 190 may be coupled to metal tube 158 at the end of metal tube 158. Antenna carrier 178 and conducive traces 180 may protrude from the end of metal tube 158 and from metal plate 190. As such, a portion of antenna carrier 178 (e.g., portion 178-1 in FIG. 11) may extend from metal plate 190 and a portion of antenna carrier 178 (e.g., portion 178-2 in FIG. 11) may be aligned with opening 200.

Figure 15:
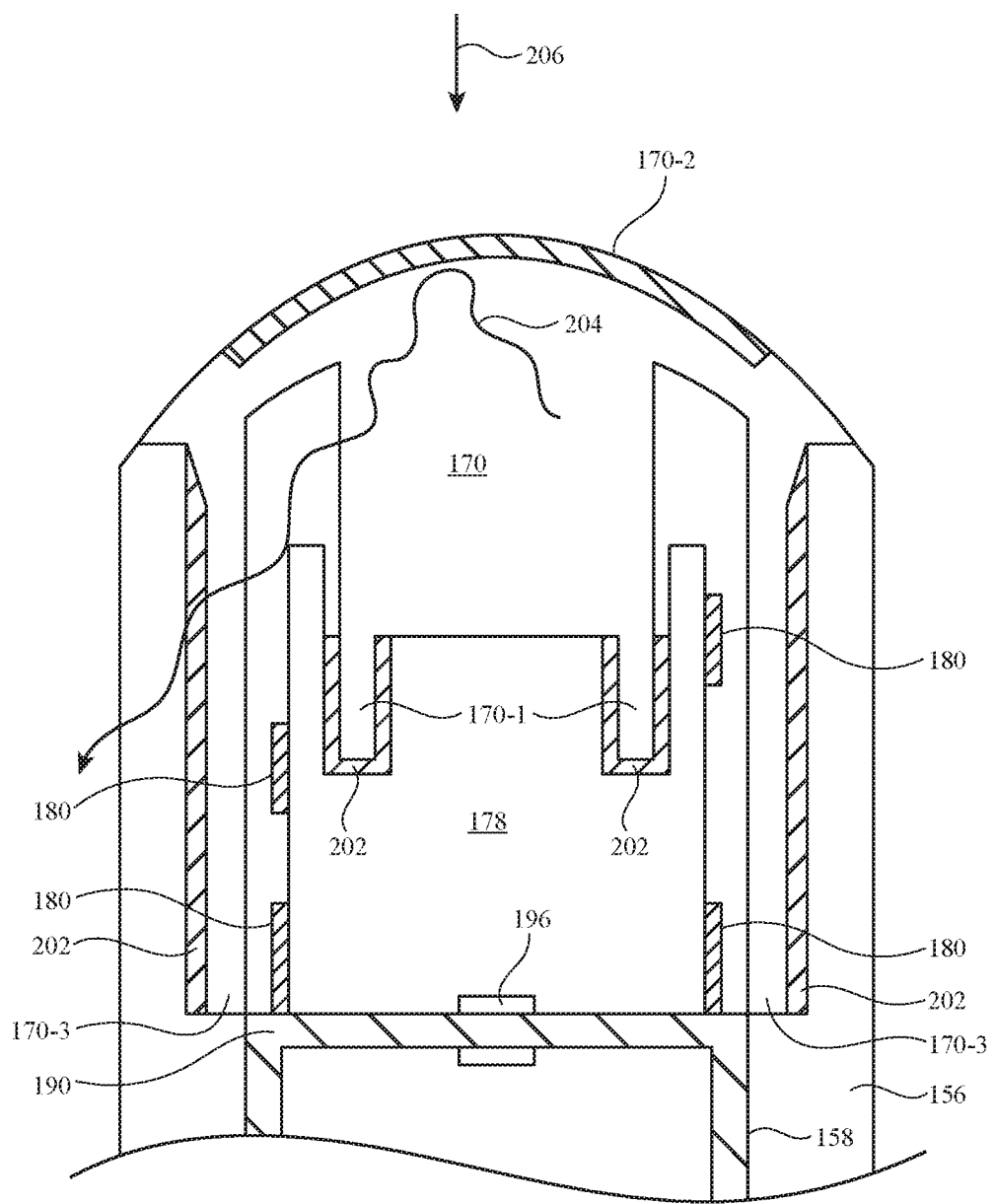
FIG. 15 is a cross-sectional view of an antenna having structures integrated with a cap structure in a stylus in accordance with some embodiments.

FIG. 15 is a cross-sectional view of stylus 10 at end 18 in which a cap structure is integrated with antenna structures formed on metal plate 190 and metal tube 158. In particular, cap structure 170 may be the topmost portion of stylus 10 (e.g., a portion of stylus 10 most distant from tip 14 in FIG. 1). As shown in FIG. 15, cap structure 170 may have elongated portions that extend into cavities of antenna carrier 178. In particular, elongated portions 170-1 of cap structure 170 may extend from a bottom surface of cap structure 170 and extend into cavities of antenna carrier 178. Cap structure 170 may include additional elongated portions 170-3 that extend from the same bottom surface of cap structure 170. Elongated portions 170-3 may be interposed between outer tube 156 and antenna carrier 178. As an example, elongated portions 170-3 may surround antenna carrier 178 on all peripheral sides of antenna carrier 178.

Figure 16A:
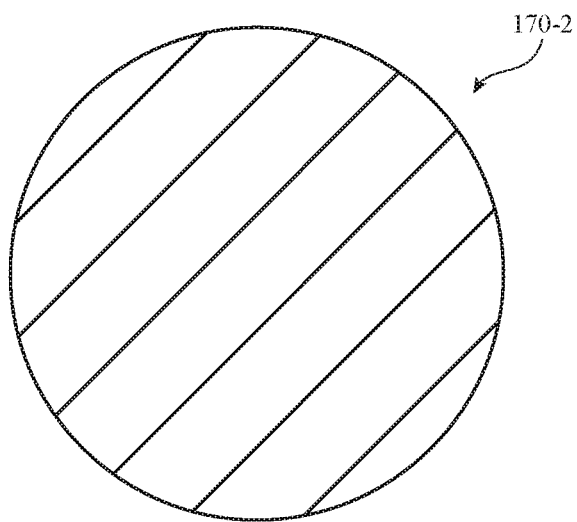
FIGS. 16A and 16B are top views of metal reflectors in cap structures for a stylus in accordance with some embodiments.

Cap structure 170 may include a metal structure such as metal structure 170-2. Metal structure 170-2 may be formed along a top surface of cap structure 170. Metal structure 170-2 may be a circular metal layer formed as part of the exterior surface of stylus 10. In another suitable arrangement, a dielectric coating or other layer may be placed over metal structure 170-2. As shown in FIG. 16A, metal structure 170-2 may have a circular profile when viewed from direction 206 in FIG. 15. Returning to FIG. 15, metal structure 170-2 may be bent to accommodate a suitable shape of stylus 10, if desired (e.g., metal structure 170-2 may be curved, spherical, aspherical, dome-shaped, etc.).

Metal structure 170-2 may serve as a reflector for antenna signals transmitted by antenna 40 in stylus 10. As an example, metal structure 170-2 may re-direct antenna signals (e.g., signal 204) in a downward direction towards tip 14 of stylus 10 and toward device 20 of FIG. 1. Metal structure 170-2 may be at floating potential (e.g., metal structure 170-2 may be electrically isolated from other conductors in stylus 10 and is not grounded).

Figure 16B:
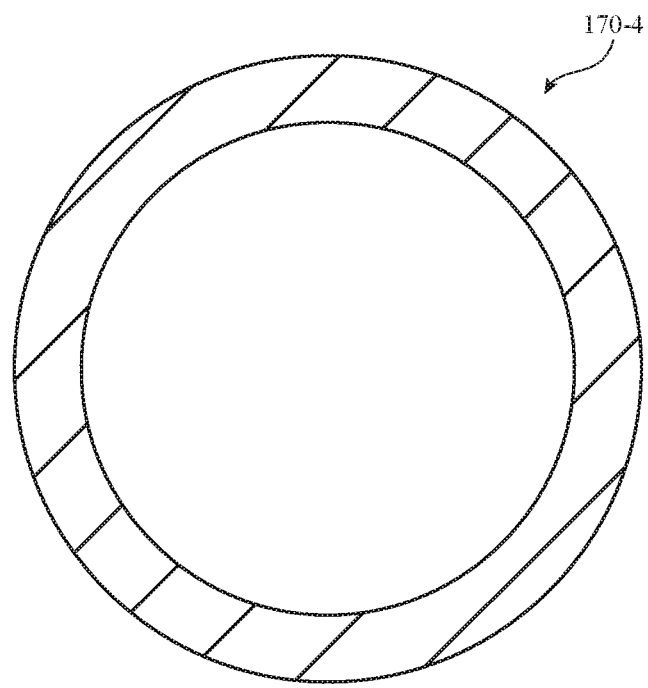

If desired, metal structure 170-2 may be a ring structure instead of a bent circular structure as depicted in FIG. 15. In particular, FIG. 16B shows how cap structure may include a metal ring such as metal ring structure 170-4 having a ring shape when viewed from direction 206 as indicated in FIG. 15. As an example, the center of metal ring structure may be filled with dielectric material when used to form cap structure 170. By using metal structure 170-2 (or metal structure 170-4) as a reflector, the performance of antenna 40 may be enhanced (e.g., the radiation pattern of antenna 40 may be more directional towards tip 14 and/or device 20 of FIG. 1). If desired, all other portions of cap structure 170 besides metal structure 170-2 (or metal structure 170-4) may be formed from dielectric or non-conductive material. If desired, structures 170-2 and 170-4 may be formed from nonmetallic conductive material. These structures may have other shapes if desired.

Returning to FIG. 15, adhesive material such as adhesive 202 may attach cap structure 170, antenna carrier 178, metal tube 158, outer layer 156, and any other structures in stylus 10 to each other. As an example, adhesive 202 may be formed at a cavity in antenna carrier 178. As another example, adhesive 202 may be formed along outer tube 156. This is merely illustrative. If desired, adhesive 202 may be formed at any suitable location in stylus 10.

Portions of cap structure may be interposed between portions of adhesive 202 and conductive traces 180 or otherwise be placed to protect conductive traces 180 from contamination. As an example, cap portion 170-3 may be interposed between adhesive 202 and conductive traces 180 on one or more sides of antenna carrier 178. As another example, cap portion 170-2 may extend into adhesive 202 at a cavity in antenna carrier 178 to prevent adhesive from flowing onto conductive traces 180 (e.g., to hold adhesive 202 in place in the antenna carrier cavity).

If desired, cap structure 170 or portions of cap structure 170 (e.g., metal structure 170-2, elongated portions 170-1 and 170-3, etc.) may have rotational symmetry about a longitudinal axis or reflective symmetry across one or more central planes. In other words, cap structure 170 may completely surround antenna carrier 178 except on a bottom side adjacent to metal layer 190 (e.g., may surround antenna carrier 178 on a top side and all peripheral sides of antenna carrier 178). These examples are merely illustrative. If desired, cap structure 170 may only partially surround antenna carrier 178 on the top and/or peripheral sides.

Figure 17:
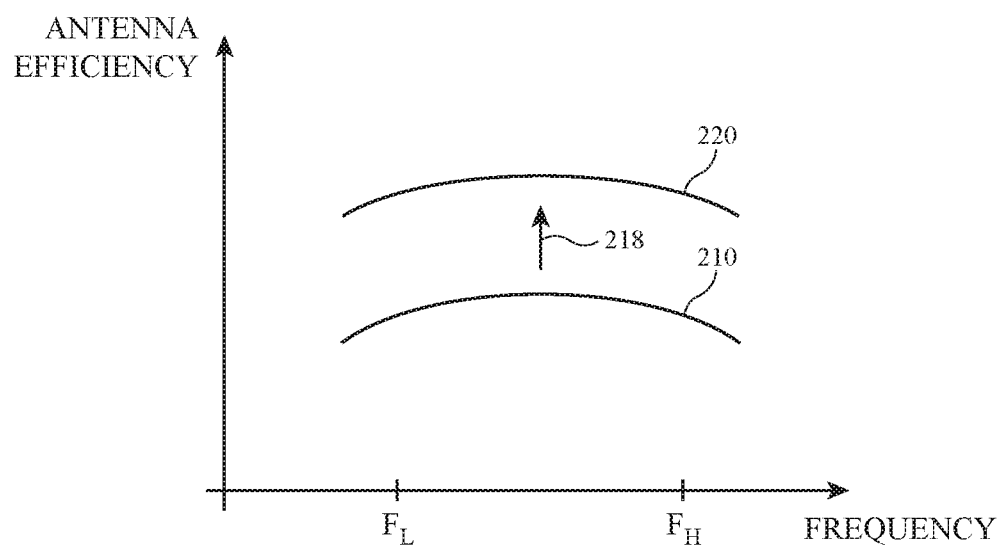
FIG. 17 is a graph of antenna performance (e.g., antenna efficiency) for an antenna of the type shown in FIGS. 11-15 in accordance with some embodiments.

FIG. 17 is a graph in which antenna performance (e.g., antenna efficiency) has been plotted as a function of operating frequency for antenna 40 of FIGS. 11-15. As shown in FIG. 17, curve 210 plots an exemplary antenna efficiency of an antenna in a first operating environment (e.g., in the absence of metal structure 170-2, in the absence of window 200 in metal tube 158, without coupling antenna ground to additional grounding structures, etc.) between frequencies $F_L$ and $F_H$. In the presence of metal structure 170-2 in cap structure 170, additional grounding structures in stylus 10, and antenna window in metal tube 158), the antenna efficiency of antenna 40 as described in connection with FIGS. 11-15 may improve (as indicated by arrow 218) to curve 220. Frequencies $F_L$ and $F_H$ may correspond to edges of a Bluetooth frequency band, as just one example.

The example of FIG. 17 is merely illustrative. In general, antenna 40 may be used to cover any desired bands at any desired frequencies (e.g., antenna 40 may exhibit any desired number of efficiency peaks extending over any desired frequency bands). Curves 210 and 220 may exhibit other shapes if desired.

In this way, a stylus may be provided with an antenna having an antenna resonating element, a return path, and an antenna ground formed from conductive traces on an antenna carrier. The conductive traces may be coupled to additional grounding structures in the stylus to improve antenna efficiency. Additionally, portions of a cap structure may include an antenna reflector to further improve antenna efficiency towards the tip of the stylus. The cap may also serve to protect the antenna from adhesive used to hole structures together within the stylus. By providing these structures in an integrated configuration, satisfactory antenna performance may be achieved within a frequency band of interest in a compact form factor such as a housing for a computer stylus.

The foregoing is merely illustrative and various modifications can be made by those skilled in the art without departing from the scope and spirit of the described embodiments. The foregoing embodiments may be implemented individually or in any combination.

What is claimed is:

1. A computer stylus comprising:
    an elongated body having a tip and an opposing end coupled by a shaft, wherein the shaft extends along a longitudinal axis and includes a metal tube;
    a dielectric support structure at the end of the elongated body that extends along the longitudinal axis and has a circumference;
    an antenna having an antenna resonating element arm on the dielectric support structure, wherein the antenna is configured to transmit radio-frequency signals;
    an additional dielectric structure that has first and second opposing sides and is attached to the dielectric support structure at the first side; and
    a reflector structure formed at the second side of the additional dielectric structure and configured to direct the radio-frequency signals towards the tip.

2. The computer stylus defined in claim 1, wherein the antenna resonating element arm is formed from conductive traces on the dielectric support structure and surrounds at least a portion of the additional dielectric structure.

3. The computer stylus defined in claim 2, wherein the conductive traces form a portion of an antenna ground and a return path that couples the portion of the antenna ground to the antenna resonating element arm, and an additional portion of the additional dielectric structure surrounds the conductive traces.

4. The computer stylus defined in claim 3, wherein the conductive traces are formed directly on the dielectric support structure.

5. The computer stylus defined in claim 3, wherein the portion of the antenna ground is electrically connected to the metal tube through a metal plate.

6. The computer stylus defined in claim 1, wherein the antenna resonating element arm on the dielectric support structure wraps more than 180 degrees around the circumference.

7. The computer stylus defined in claim 1, further comprising:
    transceiver circuitry that is coupled to the antenna by a transmission line, wherein the dielectric support structure has a groove and the transmission line extends along the groove.

8. The computer stylus defined in claim 1, further comprising:
    an outer layer that extends along the longitudinal axis and that surrounds the metal tube, wherein the additional dielectric structure is attached to the outer layer.

9. A computer stylus, comprising:
    an elongated body having a tip and an opposing end coupled by a shaft that extends along a longitudinal axis and that includes a metal tube having an opening;
    a dielectric structure at the end of the elongated body, the dielectric structure having first and second opposing ends and the first end being interposed between the tip and the second end; and
    conductive traces on the dielectric structure, wherein a first portion of the conductive traces forms an antenna resonating element arm for an antenna and a second portion of the conductive traces on the first end of the dielectric structure forms an antenna ground for the antenna, the first end of the dielectric structure being disposed at an end of the metal tube, and the antenna ground formed by the second portion of the conductive traces is aligned with the opening of the metal tube.

10. The computer stylus defined in claim 9, wherein the dielectric structure comprises a first portion on which the antenna resonating element arm is formed and a second portion on which a portion of the antenna ground is formed, wherein the second portion extends from the first portion and into the opening of the metal tube.

11. The computer stylus defined in claim 10, wherein the second portion of the conductive traces on the first end of the dielectric structure comprises a conductive trace portion on the first portion of the dielectric structure and a conductive trace portion on the second portion of the dielectric structure.

12. The computer stylus defined in claim 10, wherein the first portion of the dielectric structure comprises a cylindrical portion having a flat surface extending along the longitudinal axis and the second portion of the dielectric structure comprises a rectangular portion that extends from the cylindrical portion along the longitudinal axis.

13. The computer stylus defined in claim 9, further comprising:
 a metal layer that extends across the end of the metal tube and that electrically connects the metal tube to the conductive traces, wherein the metal layer is interposed between the end of the metal tube and the first end of the dielectric structure.

14. The computer stylus defined in claim 13, further comprising:
 a fastener that biases the metal layer to the first end of the dielectric structure.

15. The computer stylus defined in claim 9, wherein the dielectric structure extends along a longitudinal axis and has a perimeter about the longitudinal axis, the antenna resonating element arm extends along the perimeter, and the antenna ground extends along the perimeter.

16. A computer stylus, comprising:
 an elongated body having a tip and an opposing end coupled by a shaft that extends along a longitudinal axis, wherein the shaft includes a metal tube and a dielectric outer tube that covers the metal tube;
 an antenna having an antenna resonating element arm formed on a substrate; and
 a cap structure having an elongated portion that extends along the longitudinal axis, wherein the elongated portion is interposed between the outer tube and the antenna resonating element arm.

17. The computer stylus defined in claim 16, wherein the cap structure includes a metal reflector that is configured to reflect radio-frequency signals transmitted by the antenna towards the tip.

18. The computer stylus defined in claim 17, wherein the metal reflector comprises a ring-shaped metal reflector.

19. The computer stylus defined in claim 16, wherein the elongated portion of the cap structure is attached to the outer tube, the cap structure includes an additional portion that is attached to the substrate.

20. The computer stylus defined in claim 16, wherein the substrate comprises an antenna carrier that is interposed between the cap structure and the metal tube.

* * * * *

UNITED STATES PATENT AND TRADEMARK OFFICE
CERTIFICATE OF CORRECTION

PATENT NO. : 10,627,922 B2
APPLICATION NO. : 16/143009
DATED : April 21, 2020
INVENTOR(S) : Lu Zhang, Yi Jiang and Mattia Pascolini Page 1 of 1

It is certified that error appears in the above-identified patent and that said Letters Patent is hereby corrected as shown below:

In the Specification

At Column 12, Line 20, "antenna resonating element 108" should read -- antenna resonating element arm 108 --

In the Claims

In Claim 15, at Column 17, Line 29, "extends along a longitudinal axis" should read -- extends along the longitudinal axis --

Signed and Sealed this
Twenty-first Day of July, 2020

Andrei Iancu
*Director of the United States Patent and Trademark Office*